United States Patent
Xu et al.

(10) Patent No.: US 10,373,244 B2
(45) Date of Patent: Aug. 6, 2019

(54) SYSTEM AND METHOD FOR VIRTUAL CLOTHES FITTING BASED ON VIDEO AUGMENTED REALITY IN MOBILE PHONE

(71) Applicant: Futurewei Technologies, Inc., Plano, TX (US)

(72) Inventors: Jingsong Xu, Nanjing (CN); Ying Cui, Nanjing (CN); Qiang Wu, Ashfield (AU); Jian Zhang, Kensington (AU); Chen-Xiong Zhang, Plano, TX (US); Haibo Liu, Shenzhen (CN); Kui Fang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 817 days.

(21) Appl. No.: 14/799,907

(22) Filed: Jul. 15, 2015

(65) Prior Publication Data

US 2017/0018024 A1    Jan. 19, 2017

(51) Int. Cl.
*G06Q 30/00* (2012.01)
*G06Q 30/06* (2012.01)
(Continued)

(52) U.S. Cl.
CPC ..... *G06Q 30/0643* (2013.01); *G06K 9/00362* (2013.01); *G06T 11/60* (2013.01);
(Continued)

(58) Field of Classification Search
None
See application file for complete search history.

(56) References Cited

U.S. PATENT DOCUMENTS

| 7,953,648 B2 | 5/2011 | Vock |
| 2003/0110099 A1 | 6/2003 | Trajkovic et al. |

(Continued)

FOREIGN PATENT DOCUMENTS

| CN | 102298797 A | 12/2011 |
| CN | 102509349 A | 6/2012 |

(Continued)

OTHER PUBLICATIONS

BusinessWire, "Total Immersion and eBay Bring Virtual 'See It on' Feature to eBay's Fashion App", Feb. 1, 2011, youtube.com; Office Action attachment is a screen capture taken at 43 seconds into the video; the entire video can bee seen at: https://www.youtube.com/watch?v=7ezT7omejfk (Year: 2011).*

(Continued)

*Primary Examiner* — Naeem U Haq
*Assistant Examiner* — Norman Donald Sutch, Jr.
(74) *Attorney, Agent, or Firm* — Slater Matsil, LLP

(57) ABSTRACT

A system and method for virtual clothes fitting based on video augmented reality in a mobile wireless device is disclosed. In an embodiment, a method for virtual cloth-fitting with video augmentation in a mobile wireless device includes receiving a video stream of an upper body of a user; detecting a face in the video stream; detecting a shoulder contour; determining keypoints of the shoulder and neck portions of the video stream of the upper body of the user according to the detected face and the detected shoulder contour; mapping an image of clothes to the video stream of the upper body of the user according to the keypoints; and displaying an augmented video stream of the upper body of the user with the image of the clothes overlaid over a portion of the video stream of the upper body of the user.

20 Claims, 4 Drawing Sheets

(51) Int. Cl.
  *G06T 11/60* (2006.01)
  *G06T 17/20* (2006.01)
  *G06T 19/00* (2011.01)
  *G06K 9/00* (2006.01)

(52) U.S. Cl.
  CPC ............ *G06T 17/20* (2013.01); *G06T 19/006* (2013.01); *G06T 2210/16* (2013.01)

(56) References Cited

U.S. PATENT DOCUMENTS

| | | | |
|---|---|---|---|
| 2006/0204054 A1* | 9/2006 | Steinberg | H04N 5/232 382/118 |
| 2008/0037875 A1* | 2/2008 | Kim | G06K 9/00335 382/199 |
| 2009/0115777 A1 | 5/2009 | Reyers Moreno | |
| 2010/0070384 A1* | 3/2010 | Kruusmaa | A41H 1/00 705/26.1 |
| 2010/0222026 A1* | 9/2010 | Dragt | G06Q 30/02 455/412.1 |
| 2012/0062555 A1 | 3/2012 | O'Connor et al. | |
| 2012/0287122 A1 | 11/2012 | Nadar et al. | |
| 2012/0306918 A1 | 12/2012 | Suzuki et al. | |
| 2013/0113789 A1* | 5/2013 | Suzuki | G06T 19/006 345/419 |
| 2013/0135349 A1 | 5/2013 | Narayanan et al. | |
| 2013/0229482 A1* | 9/2013 | Vilcovsky | H04N 7/144 348/14.07 |
| 2013/0251203 A1* | 9/2013 | Tanabiki | G06K 9/00369 382/103 |
| 2014/0035913 A1* | 2/2014 | Higgins | G06T 17/00 345/420 |
| 2014/0139660 A1* | 5/2014 | Zhu | G06K 9/00369 348/143 |
| 2014/0168217 A1 | 6/2014 | Kim et al. | |
| 2014/0225888 A1* | 8/2014 | Bell | G06T 17/00 345/419 |
| 2014/0279289 A1 | 9/2014 | Steermann | |
| 2015/0317813 A1* | 11/2015 | Vendrow | H04N 5/76 345/634 |
| 2016/0284132 A1* | 9/2016 | Kim | G06T 19/006 |

FOREIGN PATENT DOCUMENTS

| | | |
|---|---|---|
| CN | 103871106 A | 6/2014 |
| WO | 2007057485 A2 | 5/2007 |
| WO | 2012172568 A1 | 12/2012 |

OTHER PUBLICATIONS

Cecilia Garcia Martin, Erdal Oruklu; "Human Friendly Interface Design for Virtual Fitting Room Applications on .Android Based Mobile Devices"; 2012, Journal of Signal and Information Processing; 2012 vol. 3 pp. 481-490 (Year: 2012).*

Martin, C.G et al., "Human Friendly Interface Design for Virtual Fitting Room Applications on Android Based Mobile Devices," Journal of Signal and Information Processing, Nov. 2012, 10 pages.

Miaolong, Y. et al., "A Mixed Reality Virtual Clothes Try-On System," IEEE Transactions on Multimedia, vol. 15, Issue 8, Dec. 2013, 11 pages.

* cited by examiner

SYSTEM AND METHOD FOR VIRTUAL CLOTHES FITTING BASED ON VIDEO AUGMENTED REALITY IN MOBILE PHONE

TECHNICAL FIELD

The present invention relates generally to a system and method for virtual clothes fitting, and, in particular embodiments, to a system and method for virtual clothes fitting based on video augmented reality in mobile wireless devices.

BACKGROUND

Virtual clothes-fitting systems in which a user could use a computer to "virtually" try on various articles of clothing began to emerge in 2005. These virtual clothes-fitting systems are now available from various providers and are being used by more and more prominent retailers. However, there are few such systems developed for mobile phone systems. Instead, personal computer (PC) based systems are still the most common platform on which to use these systems. Only a few prototypes exist based on mobile phone. However, these prototypes have limited function and offer poor user experiences. Furthermore, there is no straightforward manner in which to convert PC based virtual clothes-fitting onto mobile phone without sorting out several challenges and constraints. Such constraints are mainly caused by the limited computation power on mobile phones and the complexity of the algorithms currently implemented on PCs.

The interface is another challenge with implementing a virtual clothes-fitting system on mobile devices since it is difficult to efficiently put all the functions of a virtual clothes-fitting system onto a small mobile screen with a good visualization design. Furthermore, current technologies in the existing systems focus more on person detection and body segmentation from background, but do not consider how the clothes will fit onto the human body.

SUMMARY

In accordance with an embodiment of the present invention, a method for virtual cloth-fitting with video augmentation in a mobile wireless device includes receiving a video stream of an upper body of a user; detecting a face in the video stream; detecting a shoulder contour; determining keypoints of the shoulder and neck portions of the video stream of the upper body of the user according to the detected face and the detected shoulder contour; mapping an image of clothes to the video stream of the upper body of the user according to the keypoints; and displaying an augmented video stream of the upper body of the user with the image of the clothes overlaid over a portion of the video stream of the upper body of the user.

In accordance with another embodiment of the present invention, a mobile wireless device configured for virtual cloth-fitting with video augmentation includes a processor and a non-transitory computer readable storage medium storing programming for execution by the processor, the programming including instructions to: receive a video stream of an upper body of a user; detect a face in the video stream; detect a shoulder contour; determine keypoints of the shoulder and neck portions of the video stream of the upper body of the user according to the detected face and the detected shoulder contour; map an image of clothes to the video stream of the upper body of the user according to the keypoints; and display an augmented video stream of the upper body of the user with the image of the clothes overlaid over a portion of the video stream of the upper body of the user.

In accordance with another embodiment of the present invention, a mobile wireless device configured for virtual cloth-fitting with video augmentation includes a camera; a live video stream acquisition unit comprising a processor, the live video stream acquisition unit configured to receive a live video stream from the camera; a system initialization unit comprising a processor, the system initialization unit configured to detect a face in the live video stream, detect a shoulder contour, and determine keypoints of the shoulder and neck portions of the video stream of the upper body of the user according to the detected face and the detected shoulder contour; a virtual-cloth fitting unit comprising a processor, the virtual-cloth fitting unit configured to map an image of clothes to the video stream of the upper body of the user according to the keypoints; and a video display configured to display an augmented video stream of the upper body of the user with the image of the clothes overlaid over a portion of the video stream of the upper body of the user.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
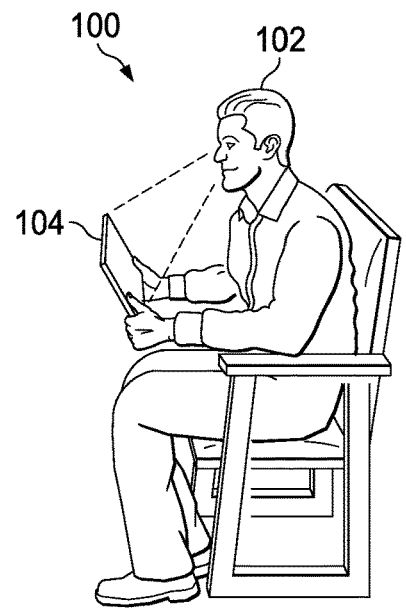
FIG. 1 is a pictorial diagram of a typical embodiment of an application scenario for a virtual cloth fitting based on video augmented reality.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

To tackle the challenges discussed above, disclosed are systems and methods which build a video based augmented reality that is able to handle real-time virtual clothes fitting on a mobile platform. Embodiments of the disclosed systems and methods provide an interface for efficiently placing the functions of a virtual clothes-fitting system on a small mobile screen in a visually pleasing and usable manner.

Disclosed herein are systems and methods to perform real-time virtual clothes-fitting within a live video stream, typically using a mobile wireless device. A framework supports active size fitting and active body fitting and, especially, adaptive and deformable cloth fitting over a video stream fast and accurately. The disclosed systems and methods provide users with real-time virtual clothes-fitting experiences. These systems and methods may be used to improve a customer's shopping experience and to promote sales. The systems can be applied in any mobile wireless device as an augmented reality application. In an embodiment, given the live video stream, a face location is detected first. Such information is adopted to locate the neck and shoulder edges. The cloth or clothing selected by the user is superimposed on the upper body accordingly. Moreover, by tracking the key points of the neck and shoulder, the virtual cloth or virtual clothing is adaptively fitted and deformedly moves with body movement. Embodiments of the disclosed systems and methods may be linked to social networking applications.

In an embodiment, the disclosed systems and methods perform virtual cloth fitting using a single device and without explicit background subtraction. Embodiments utilize a limited region of interest (ROI) detection on the upper body only to reduce processing requirements that are required by prior systems that detect the entire body. Embodiments are disclosed that do not require pose estimation nor a 3-D rendering engine. Furthermore, embodiments do not require gender selection as some prior methods require. Additionally, disclosed embodiments perform neck and shoulder localization algorithm based on the face, facial landmark detection, regression and segmentation methods, thereby reducing the complexity of the disclosed systems and methods as compared to existing systems that require control points for the entire body. Disclosed embodiment perform active and deformable cloth fitting by shoulder tracking and a cloth fitting algorithm without tracking the movement of the entire body.

Existing video augmented reality systems either require more processing power than is available or efficient to use in mobile phones or, ones that are provided for mobile phones do not provide video augmented reality, but rather provide only static images. Embodiments of the disclosed systems and methods provide virtual cloth fitting which supports active size fitting, active body fitting and especially adaptive and deformable cloth fitting through live video.

The disclosed systems and methods are described herein primarily with reference to implementation within a mobile wireless device like a mobile phone. Although typical embodiments will utilize mobile devices, those of ordinary skill in the art will recognize that the disclosed systems and methods are not limited to mobile devices and may be implemented in many different types of data processing systems that have sufficient resources to perform the disclosed functions.

FIG. 1 is a pictorial diagram of a typical embodiment of an application scenario 100 for a virtual cloth fitting based on video augmented reality. The scenario 100 includes a person 102 holding a wireless device 104, such as a smart phone. The person 102 uses the wireless device 104 to take a video of the person's head, face, shoulders, and upper body. In an embodiment, the video includes at least a portion of the person's torso and possibly a portion of the upper arms of the person 102. The video will typically include less than the person's entire body. By using only a video of only a portion of the person's body, processing speed can be increased due to limiting the amount of data to be processed and the ability to use simpler algorithms than would be used if the entire body were videoed.

Figure 2:
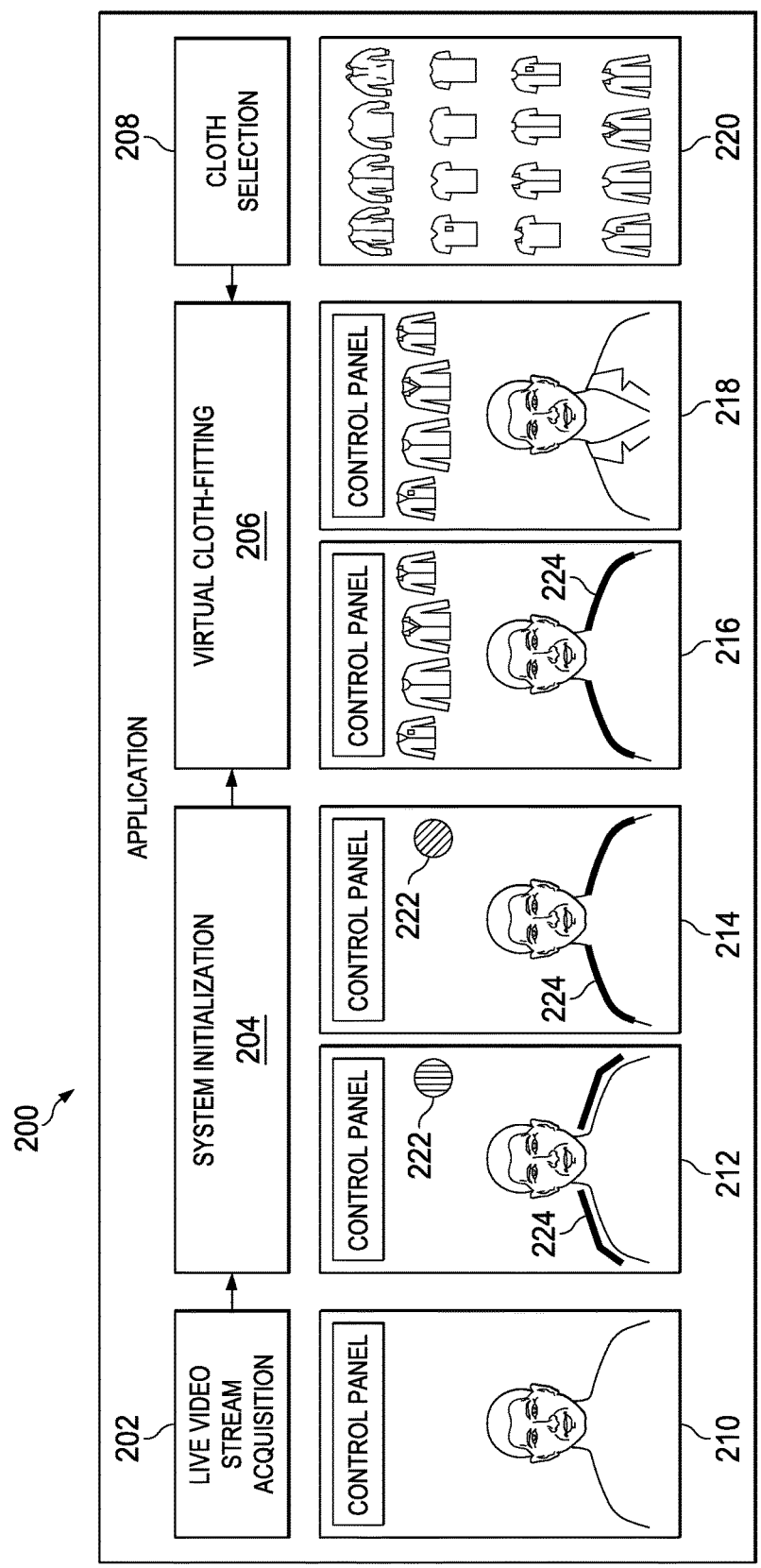
FIG. 2 is a block diagram of an embodiment of a system for virtual clothes fitting based on video augmented reality in a wireless mobile device.

FIG. 2 is a block diagram of an embodiment of a system 200 for virtual clothes fitting based on video augmented reality in a wireless mobile device. The system 200 includes a live video stream acquisition mode 202, a system initialization mode 204, a virtual cloth-fitting mode 206, and a cloth selection mode 208. In the live video stream acquisition mode 202, the user turns on the frontal camera in the wireless device. A live video stream of the user's upper body will be obtained and presented on the display 210 of the wireless device. Screen 210 is an example of the display 210 presented on the wireless device. In the system initialization mode 204, the display 212 shows a few guided lines 224 to guide the user to be placed onto the typical screen area. The indicator 222 (e.g., changing from a red dot to a green dot) on the display 212 prompts the user that they may proceed to the virtual clothes-fitting mode 206 when the user body part is in the correct place with respect to the guide lines 224 as shown in screen 214. Images of clothing from which the user may select may be shown in a portion of the screen as in screen 216 or the user may navigate to screen 220 to select clothing. The selected cloth candidate made in cloth selection mode 208 using, for example, screen 220 is superimposed onto the image of the user's upper body in display 218. The user can see the live virtual clothes-fitting results by moving his body and selecting different clothes. As the user moves, the clothing moves to stay fit to the user so that the user can see how the clothes look from different angles and how the clothes move when the user moves.

Figure 3:
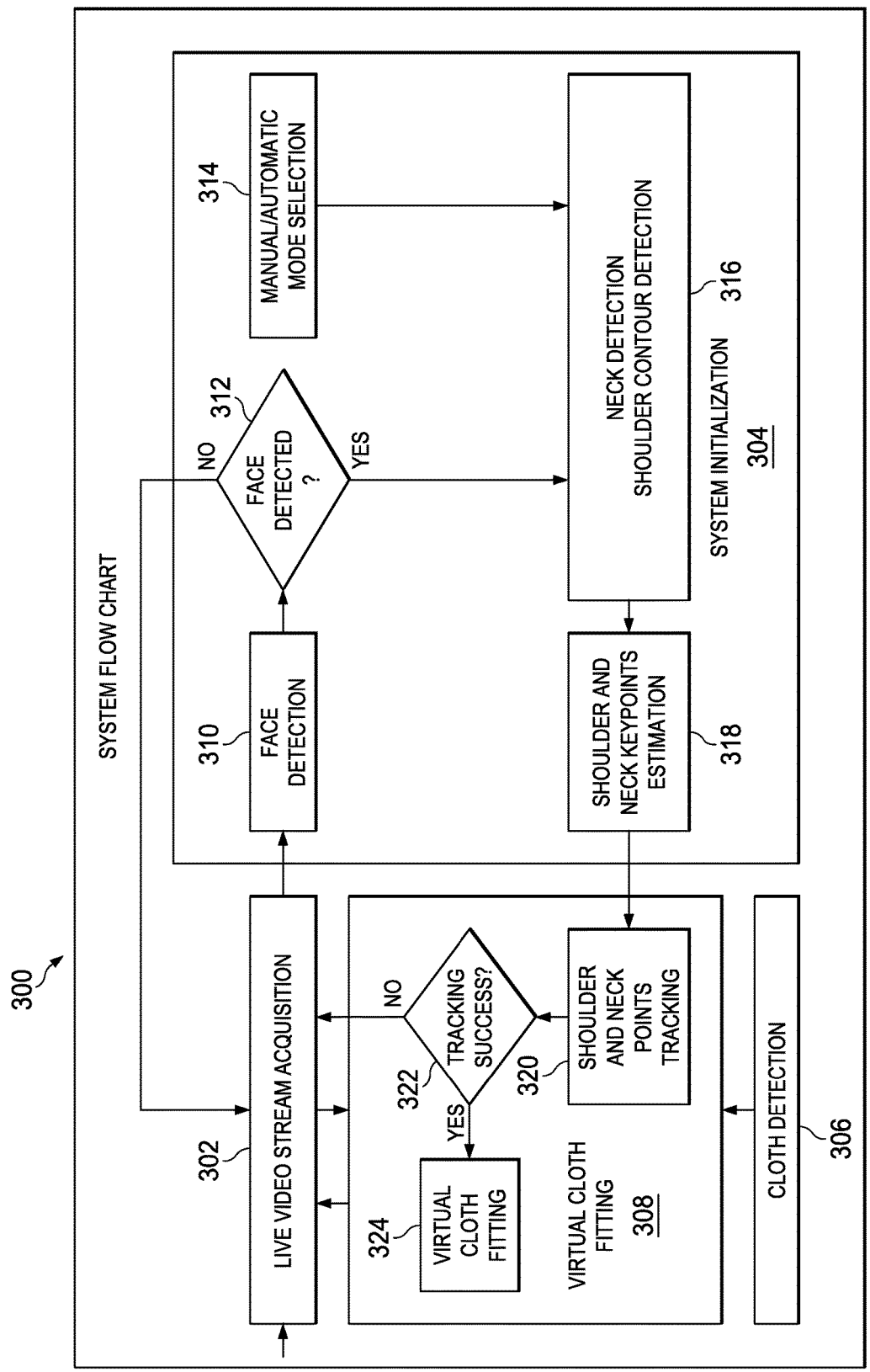
FIG. 3 is a block diagram of an embodiment of a system for virtual clothes fitting based on video augmented reality in a wireless mobile device.

FIG. 3 is a block diagram of an embodiment of a system 300 for virtual clothes fitting based on video augmented reality in a wireless mobile device. The method system can be divided into four stages: live video stream acquisition 302, system initialization 304, cloth selection 306, and virtual clothes-fitting 308. More details about system initialization and virtual clothes-fitting are described below.

The system 300 begins provides live video stream acquisition 302. After live video stream acquisition 302, the system 300 proceeds to the system initialization stage 304.

In the system initialization stage 304, given the live video stream 302, the first step is to locate the feasible area on the screen for placing the human upper body properly. To locate the proper area on the screen, the system is trained through a learning process before the software is installed in the device. During training, a sufficient number of training samples are collected, where different sizes of human body, different genders, dressing different clothes are considered. The outcome of this learning process is to make the system capable to detect human face 310, to detect neck and shoulder contour 316, and to locate the keypoints of neck and shoulder 318. To assist the system to stably detect human upper body, guidance lines appear on the screen as shown in FIG. 2 to assist the user to put the upper body on the screen properly and also to assist the system to stably detect upper body position. In order to put the user's upper body into the guidance region mention above, the user need to adjust his posture and also the distance/angles of the mobile phone to the user. The system simultaneously performs face detection 310, determines whether the face is detected 312, and gives different prompts/feedbacks in case that the face is not detected in order to further acquire a live video stream 302. In order to locate shoulder and neck positions, face location is detected to predict neck position which is used finally to detect shoulder location 316. In the end, neck and shoulder keypoints are estimated for virtual clothes-fitting 318. The system provides the user an option to select operation mode (manual or automatic) 314. In the manual mode, the system 300 continues detecting face until the user presses a confirm button on the screen to confirm that the upper body has been put inside the proper location. Then, the neck and shoulder localization 316 can be determined. This mode may provide better shoulder and neck localization results, especially in a complex environment. In the automatic mode, the system 300 performs all above processes (detecting face location and locating shoulder and neck) automatically once the system 300 determines that the human body has been located inside the proper region. In the case of a relatively simply environment, it can simplify the user process. General neck and shoulder contour detection methods can be applied here.

Virtual Clothes-fitting 308 contains the estimated keypoints tracking 320 and clothes-fitting 324 steps. The keypoints of neck and shoulder are tracked using sparse optical flow method, so it will allow the human body to have reasonable movement. After selecting cloth in 306, a virtual cloth will be superimposed on the user's body. Virtual clothes-fitting 324 is achieved through a transformation process which warps the relevant positions on the cloth plane to the corresponding positions on the human plane. As only human shoulder information can be extracted from the captured image, in an embodiment, a parametric transformation method is used to do cloth warping. Given a set of matched keypoints on both images, cloth image and human image, their Delaunay triangulation can be obtained and an affine warping transformation defined by the vertexes can be used inside each triangle.

Figure 4:
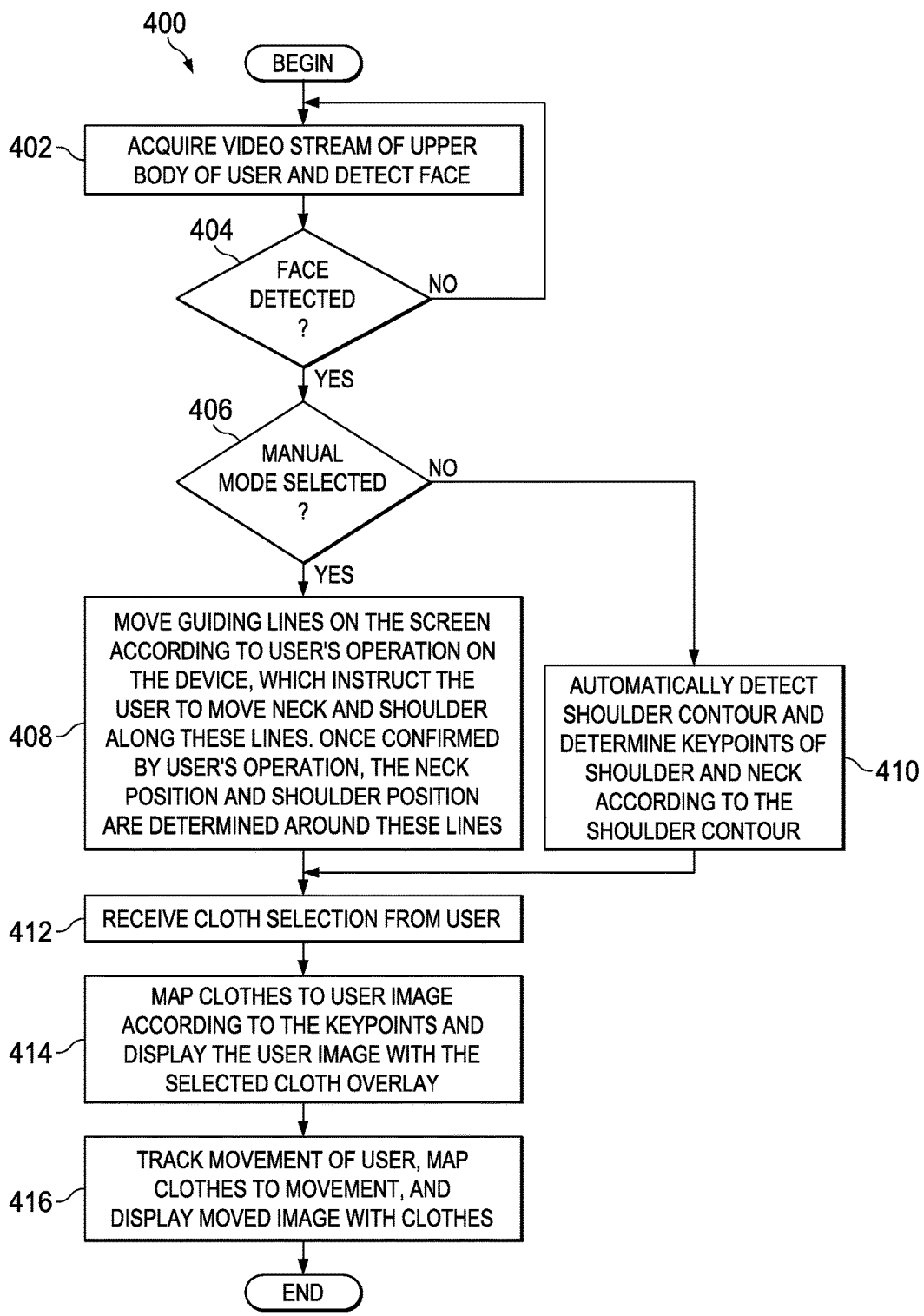
FIG. 4 is a flowchart of an embodiment of a method for virtual clothes fitting based on video augmented reality in a wireless mobile device.

FIG. 4 is a flowchart of an embodiment of a method 400 for virtual clothes fitting based on video augmented reality in a wireless mobile device. The method 400 begins at block 402 where the wireless device acquires a video stream and attempts to detect a face in the video stream. At block 404, the device determines whether a face has been detected. If not, then the method 400 proceeds back to block 402 to continue to attempt to detect a face. If, at block 404, a face is detected, the method 400 proceeds to block 406 where the device determines whether the user has selected manual mode. If manual mode has been selected, then the method 400 proceeds to block 408 where the device receives user input to move guiding lines on the screen according to user's operation on the device. The device provides an indication or instructions to the user which instruct the user to move neck and shoulder along these lines. Once confirmed by user's operation, the neck position and shoulder position are determined around these lines. If, at block 406, manual mode has not been selected, then the method 400 proceeds to block 410 to automatically detect shoulder contour and determine keypoints of the shoulder and neck according to the automatically determined shoulder contour. At block 412, the device receives a cloth selection from the user. At block 414, the device maps the clothes to the user image according to the keypoints and displays the user image with the selected cloth overlaid. At block 416, the device tracks the users movement, maps the clothes to the movement, and displays the new image of the user with clothes overlaid, after which, the method 400 ends.

Figure 5:
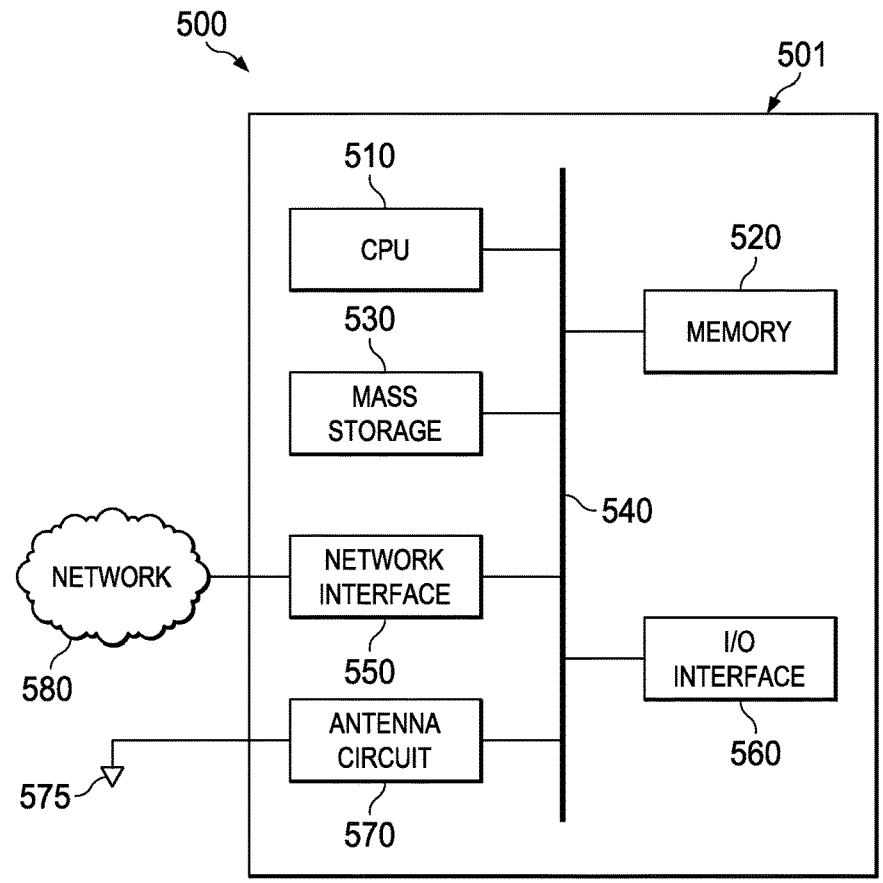
FIG. 5 is a block diagram of a processing system that may be used for implementing the devices and methods disclosed herein.

FIG. 5 is a block diagram of a processing system 500 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, memory 520, a mass storage device 530, a network interface 550, an I/O interface 560, and an antenna circuit 570 connected to a bus 540. The processing unit 501 also includes an antenna element 575 connected to the antenna circuit.

The bus 540 may be one or more of any type of several bus architectures including a memory bus or memory controller, a peripheral bus, video bus, or the like. The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs.

The mass storage device 530 may comprise any type of storage device configured to store data, programs, and other information and to make the data, programs, and other information accessible via the bus 540. The mass storage device 530 may comprise, for example, one or more of a solid state drive, hard disk drive, a magnetic disk drive, an optical disk drive, or the like.

The I/O interface 560 may provide interfaces to couple external input and output devices to the processing unit 501. The I/O interface 560 may include a video adapter. Examples of input and output devices may include a display coupled to the video adapter and a mouse/keyboard/printer coupled to the I/O interface. Other devices may be coupled to the processing unit 501 and additional or fewer interface cards may be utilized. For example, a serial interface such as Universal Serial Bus (USB) (not shown) may be used to provide an interface for a printer.

The antenna circuit 570 and antenna element 575 may allow the processing unit 501 to communicate with remote units via a network. In an embodiment, the antenna circuit 570 and antenna element 575 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 570 and antenna element 575 may also provide Bluetooth and/or WiFi connection to other devices.

The processing unit 501 may also include one or more network interfaces 550, which may comprise wired links, such as an Ethernet cable or the like, and/or wireless links to access nodes or different networks. The network interface 501 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

In a disclosed embodiment, a method for virtual cloth-fitting with video augmentation in a mobile wireless device includes receiving a video stream of an upper body of a user; detecting a face in the video stream; detecting a shoulder contour; determining keypoints of the shoulder and neck portions of the video stream of the upper body of the user according to the detected face and the detected shoulder contour; mapping an image of clothes to the video stream of the upper body of the user according to the keypoints; and displaying an augmented video stream of the upper body of the user with the image of the clothes overlaid over a portion of the video stream of the upper body of the user. In an embodiment, the method also includes tracking movement of the user; remapping the image of the clothes to the movement; and displaying a remapped augmented video stream of the upper body with the remapped image of the clothed overlaid over a portion of the video stream of the upper body of the user, wherein the video display of the clothes moves with the movement of the image of the user in the augmented video stream. In an embodiment, mapping the image of the clothes includes transforming relevant positions on a plane of the clothes with corresponding positions on a plane of the image of the user's upper body. In an embodiment, remapping the image of the clothes includes a Delaunay triangulation. The shoulder contour is automatically determined or the face and the shoulder contour are determined according to user input. In an embodiment, a manual method of face and shoulder contour identification includes attempting to detect the face, presenting a candidate face region to the user, and receiving a user input confirming that the candidate face region corresponds to the user's face. The manual method may also include receiving user input moving a shoulder contour outline.

In a disclosed embodiment, a mobile wireless device configured for virtual cloth-fitting with video augmentation includes a processor and a non-transitory computer readable storage medium storing programming for execution by the processor, the programming including instructions to: receive a video stream of an upper body of a user; detect a face in the video stream; detect a shoulder contour; determine keypoints of the shoulder and neck portions of the video stream of the upper body of the user according to the detected face and the detected shoulder contour; map an image of clothes to the video stream of the upper body of the user according to the keypoints; and display an augmented video stream of the upper body of the user with the image of the clothes overlaid over a portion of the video stream of the upper body of the user. In an embodiment, the programming further includes instructions to track movement of the user; remap the image of the clothes to the movement; and display a remapped augmented video stream of the upper body with the remapped image of the clothed overlaid over a portion of the video stream of the upper body of the user, wherein the video display of the clothes moves with the movement of the image of the user in the augmented video stream. In an embodiment, the instructions to remap the image of the clothes comprises instructions to transform relevant positions on a plane of the clothes with corresponding positions on a plane of the image of the user's upper body. In an embodiment, the instructions to remap the image of the clothes includes instructions to execute a Delaunay triangulation. The shoulder contour may be automatically determined or the face and the shoulder contour are manually determined according to user input. In an embodiment, the programming includes instructions to attempt to detect the face, present a candidate face region, and receive a user input confirming that the candidate face region corresponds to the user's face. In an embodiment, the programming includes instructions to receive user input moving a shoulder contour outline.

In a disclosed embodiment, a mobile wireless device configured for virtual cloth-fitting with video augmentation includes a camera; a live video stream acquisition unit comprising a processor, the live video stream acquisition unit configured to receive a live video stream from the camera; a system initialization unit comprising a processor, the system initialization unit configured to detect a face in the live video stream, detect a shoulder contour, and determine keypoints of the shoulder and neck portions of the video stream of the upper body of the user according to the detected face and the detected shoulder contour; a virtual-cloth fitting unit comprising a processor, the virtual-cloth fitting unit configured to map an image of clothes to the video stream of the upper body of the user according to the keypoints; and a video display configured to display an augmented video stream of the upper body of the user with the image of the clothes overlaid over a portion of the video stream of the upper body of the user. In an embodiment, the virtual-cloth fitting unit is further configured to track movement of the user and to remap the image of the clothes to the movement. In an embodiment, the virtual-cloth fitting unit is further configured to transform relevant positions on a plane of the clothes with corresponding positions on a plane of the image of the user's upper body. In an embodiment, the virtual-cloth fitting unit is further configured to execute a Delaunay triangulation. In an embodiment, the display is configured to present a candidate face region and to receive a user input confirming that the candidate face region corresponds to the user's face.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for virtual cloth-fitting, comprising:
    prompting, by an indicator on a display of a mobile device, a user of the mobile device to correctly place a video stream of an upper body portion of the user using guidelines presented on the display, the video stream being captured by a camera of the mobile device;
    detecting, by the mobile device, a location of a face of the user in the video stream from the correct placement of the video stream of the upper body portion of the user using the guidelines;
    predicting, by the mobile device, a position of a neck of the user using the detected location of the face of the user;
    detecting, by the mobile device, a location of a shoulder contour of the user in the video stream from the predicted position of the neck;
    estimating, by the mobile device, keypoints of shoulder and neck portions of the user in the video stream using the detected location of the shoulder contour and the predicted position of the neck, respectively;
    mapping, by the mobile device, an image of clothes to the video stream of the upper body portion of the user using the estimated keypoints; and
    displaying, by the display, an augmented video stream of the upper body portion of the user with the mapped image of clothes overlaid over a portion of the video stream of the upper body portion of the user.

2. The method of claim 1, further comprising:
    tracking movement of the user;
    remapping, by the mobile device, the image of clothes in accordance with the movement; and
    displaying, by the display, a remapped augmented video stream of the upper body portion of the user with the remapped image of clothes overlaid over a portion of the remapped augmented video stream of the upper body portion of the user, wherein the remapped image of clothes corresponds to the movement of the user.

3. The method of claim 2, wherein remapping the image of clothes comprises transforming relevant positions on a plane of the image of clothes with corresponding positions on a plane of an image of the upper body portion of the user.

4. The method of claim 2, wherein the remapping the image of clothes comprises a Delaunay triangulation.

5. The method of claim 1, wherein the shoulder contour is automatically determined.

6. The method of claim 1, wherein the face and the shoulder contour are determined according to user input.

7. The method of claim 6, further comprising attempting to detect the face, presenting a candidate face region, and receiving a user input confirming that the candidate face region corresponds to the face of the user.

8. The method of claim 6, further comprising receiving user input moving a shoulder contour outline.

9. A mobile wireless device, comprising:
a camera;
a display;
a non-transitory memory storage comprising instructions; and
a processor in communication with the camera, the display, and the non-transitory memory storage, wherein the processor executes the instructions to:
prompt, by an indicator on the display, a user of the mobile wireless device to correctly place a video stream of an upper body portion of the user using guidelines presented on the display, the video stream being captured by the camera;
detect a location of a face of the user in the video stream from the correct placement of the video stream of the upper body portion of the user using the guidelines;
predict a position of a neck of the user using the detected location of the face of the user;
detect a location of a shoulder contour of the user in the video stream from the predicted position of the neck;
estimate keypoints of shoulder and neck portions of the user in the video stream using the detected location of the shoulder contour and the predicted position of the neck, respectively;
map an image of clothes to the video stream of the upper body portion of the user using the estimated keypoints; and
display, by the display, an augmented video stream of the upper body portion of the user with the mapped image of clothes overlaid over a portion of the video stream of the upper body portion of the user.

10. The mobile wireless device of claim 9, wherein the processor executes the instructions to:
track movement of the user;
remap the image of clothes in accordance with the movement of the user; and
display, by the display, a remapped augmented video stream of the upper body portion of the user with the remapped image of clothes overlaid over a portion of the video stream of the upper body portion of the user, wherein the remapped image of clothes corresponds to the movement of the user.

11. The mobile wireless device of claim 10, wherein instructions to remap the image of clothes comprises instructions to transform relevant positions on a plane of the image of clothes with corresponding positions on a plane of an image of the upper body portion of the user.

12. The mobile wireless device of claim 10, wherein the instructions to remap the image of clothes comprises instructions to execute a Delaunay triangulation.

13. The mobile wireless device of claim 9, wherein the shoulder contour is automatically determined.

14. The mobile wireless device of claim 9, wherein the face and the shoulder contour are determined according to user input.

15. The mobile wireless device of claim 14, wherein the processor executes the instructions to attempt to detect the face of the user, present a candidate face region, and receive a user input confirming that the candidate face region corresponds to the face of the user.

16. A mobile wireless device, comprising:
a camera;
a live video stream acquisition unit comprising a processor, the live video stream acquisition unit configured to prompt a user of the mobile wireless device to correctly place a live video stream of an upper body portion of the user using guidelines presented to the user, the live video stream being captured by the camera;
a system initialization unit comprising a first processor, the system initialization unit configured to detect a location of a face of the user in the live video stream from the correct placement of the video stream of the upper body portion of the user using the guidelines, predict a position of a neck of the user using the detected location of the face of the user, detect a location of a shoulder contour of the user in the live video stream from the predicted position of the neck, and estimate keypoints of the shoulder and neck portions of the user in the live video stream using the detected location of the shoulder contour and the predicted position of the neck, respectively;
a virtual-cloth fitting unit comprising a second processor, the virtual-cloth fitting unit configured to map an image of clothes to the live video stream of the upper body portion of the user using the estimated keypoints; and
a video display configured to display an augmented video stream of the upper body portion of the user with the mapped image of clothes overlaid over a portion of the live video stream of the upper body portion of the user.

17. The mobile wireless device of claim 16, wherein the virtual-cloth fitting unit is further configured to track movement of the user and to remap the image of clothes in accordance with the movement.

18. The mobile wireless device of claim 17, wherein the virtual-cloth fitting unit is further configured to transform relevant positions on a plane of the image of clothes with corresponding positions on a plane of an image of the upper body portion of the user.

19. The mobile wireless device of claim 17, wherein the virtual-cloth fitting unit is further configured to execute a Delaunay triangulation.

20. The mobile wireless device of claim 16, wherein the video display is further configured to present a candidate face region and to receive a user input confirming that the candidate face region corresponds to the face of the user.

* * * * *